United States Patent [19]

Davidson

[11] Patent Number: 4,817,778

[45] Date of Patent: Apr. 4, 1989

[54] ARRANGEMENT FOR CONVEYOR SYSTEMS

[76] Inventor: Mats I. Davidson, Djupadal, S-502 78 Gånghester, Sweden

[21] Appl. No.: 46,046

[22] PCT Filed: Aug. 4, 1986

[86] PCT No.: PCT/SE86/00351

§ 371 Date: Mar. 31, 1987

§ 102(e) Date: Mar. 31, 1987

[87] PCT Pub. No.: WO87/00821

PCT Pub. Date: Feb. 12, 1987

[30] Foreign Application Priority Data

Aug. 8, 1985 [SE] Sweden ............................. 8503746

[51] Int. Cl.$^4$ ............................................. B65G 17/20
[52] U.S. Cl. ............................... 198/346.1; 198/465.4; 198/803.7; 198/700
[58] Field of Search ................. 198/465.4, 346.1, 852, 198/803.7, 700

[56] References Cited

U.S. PATENT DOCUMENTS

| | | | |
|---|---|---|---|
| 2,460,447 | 2/1949 | Clarkson | 198/852 |
| 2,463,970 | 3/1949 | Hunnicutt | 198/852 |
| 3,338,179 | 8/1967 | Klemm | 198/678 X |
| 3,592,141 | 7/1971 | Davidson | 104/88 |
| 3,688,893 | 9/1972 | Wallace, Jr. | 198/700 X |
| 3,713,648 | 1/1973 | Spika | 198/803.7 X |
| 4,201,286 | 5/1980 | Meier | 198/465.4 X |
| 4,320,894 | 3/1982 | Reist et al. | 198/803.7 X |
| 4,615,273 | 10/1986 | Osthus et al. | 198/465.4 X |

*Primary Examiner*—Frank E. Werner
*Assistant Examiner*—D. Glenn Dayoan

[57] ABSTRACT

Arrangement for conveyor systems which are intended to transport objects (19) to particular places, for example work stations (4). The system comprises an upper transport level with conveyor arrangements which are so adapted as to transport the objects in an essentially horizontal direction and a lower level, at which the work stations are situated, with a second conveyor arrangement so adapted as to transport the objects between the upper level and the lower level for the transport of the objects to the work stations from the upper level and from the work stations to the upper level for onward transport in the latter. The second conveyor arrangement comprises a number of chains (28) which extend in the form of endless loops between the upper and the lower level. They are advanced by, for example, chain wheels (30) for the transport of the objects between the levels. Near the work stations are arrangements for transferring the objects (19) from the first to the second conveyor arrangement (21) and, once they have been transported to and away from the work station, for returning them to the aforementioned conveyor track (23) with the help of arrangements (54) for the transfer of the objects between the conveyor arrangements.

5 Claims, 4 Drawing Sheets

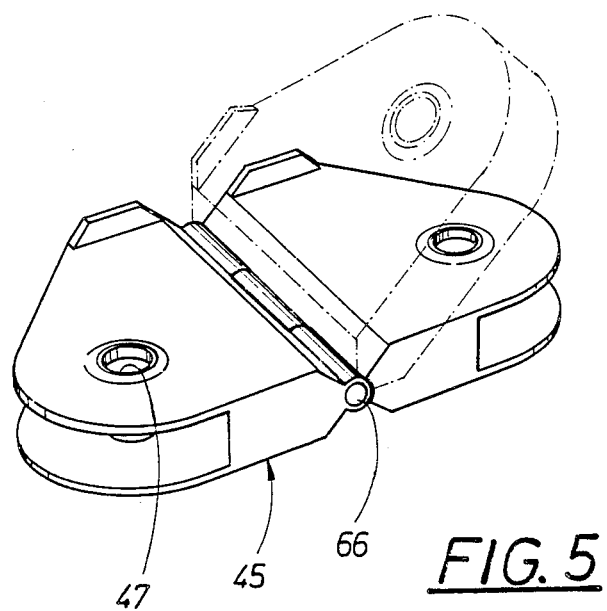

ARRANGEMENT FOR CONVEYOR SYSTEMS

TECHNICAL FIELD

The present invention relates to an arrangement for conveyor systems. More precisely the invention relates to such conveyor systems as are arranged in transfer lines and which in that case transport materials, for example work pieces, between different stations for processing, inspection or grading, for example.

BACKGROUND

Certain types of such conveyor systems consist of a conveyor belt, a track for trolleys or some other conveyor installation by means of which work pieces are transported, for example, through a number of work stations and are subjected on their way to different operations at these stations whilst they are still being supported by the conveyor track. Such conveyor tracks are used to a considerable extent in automobile manufacture and also in the assembly and/or processing of other more complex units. However, this method requires that the operations be capable of being divided up in such a way that they need to spend more or less the same time in each of the stations, and that the stations be capable of being laid out in the sequence in which they will be transited.

In another type of conveyor system there is present a principal line, and running from it side lines which lead from the principal line to the respective work station. A conveyor system of this kind is more easily adaptable to different operating conditions than the first-mentioned system, because the work pieces can be transported from the principal line via the side lines to the work stations, where they can remain for the time necessary for the operation, whereupon they are fed back to the principal line for transport to the next station. If the principal line is executed in the form of a ring, the material can be made to cover a number of circuits, and the work stations accordingly do not need to lie in any particular sequence. Conveyor systems of this kind have been used considerably within the ready-made clothing industry. It is difficult to arrange for the different operations involved in the production of finished garments, for example sewing together, applique work, button-holing, sewing on buttons and pressing to take the same time. The production runs are also relatively short, with a constantly changing range of garments and sizes. These problems, which would very likely be insurmountable in the first-mentioned type of conveyor track, are easily overcome in the second type of conveyor system through the selective guidance of the work pieces to the different work stations, without these having to be rearranged in conjunction with a change in the production run. By using a reasonable selection of standard stations at which the various types of operations required for different types of garment can be performed, it is possible to produce a number of varying designs by guiding the material to the stations concerned in one and the same system.

The arrangement in accordance with the present invention relates in the first place to the second type of system, due to the fact that it exhibits its greatest benefits in this context. The possibility is not excluded, however, of utilizing the arrangement in conjunction with the first type of conveyor track.

An example of a conveyor system of the second type is given in U.S. Pat. No. 3,592,141, Inge Davidsson. Use is made here of an endless, loop-shaped principal conveyor and of a number of side conveyors. Trolleys carrying work pieces can be moved by the use of points and crossings from the principal conveyor to a desired side conveyor and along the latter to a stationary position at a work station. The trolley can be moved on from the work station along the side conveyor and back onto the principal conveyor for distribution to the next work station, or, after leaving the final work station, for discharging of the finished work piece. In the case of the specified system each trolley is addressed by means of a mechanism attached to it for the purpose of its distribution onto the desired side conveyor, and is then capable of being readdressed at each work station. There are other examples of similar conveyor systems in which the addressing instead takes place via a central control function.

TECHNICAL PROBLEM

In the case of the system described in the aforementioned patent, and also in the case of other previously disclosed examples, the side conveyor runs along a fixed rail to a fixed stationary position in which the work piece can be collected for processing. This arrangement can, of course, be dimensioned at the design stage in accordance with the prevailing circumstances, although all changes call for considerable work. Variations of a temporary nature in the conditions affecting the work station, such as a change of equipment, a change in the working position for the processing, or the processing of work pieces of different types and with different dimensions are more often than not incapable for this reason of being accommodated by a modification to the conveyor system such as a change in the length of the side conveyor. One will instead be faced with a considerable amount of handling work in order to move the work piece from its stationary position on the conveyor to the correct working position at the work station.

THE SOLUTION

In the case of the arrangement in accordance with the invention the side conveyor comprises a number of long, flexible elements such as chains, so arranged as to extend in an endless loop between an upper level, at which the principal conveyor is situated, and a lower level, at which the work stations are situated, and so adapted as to be advanced by means of feed devices such as chain wheels for the transport of the objects between the levels, in conjunction with which there are provided near the work stations arrangements for receiving the objects, or, where appropriate, carriers for same, from the principal conveyor, and, once they have been transported to and away from the work stations, for transferring them to a second transport means such as that already mentioned or a further conveyor with the help of arrangements for the transfer of the objects of the carriers between the aforementioned conveyors.

ADVANTAGES

Achieved through the present invention is a conveyor system for the transport of objects between different stations, which permits very considerable adaptability with regard to the transport of the object to, and its position at each station.

BRIEF DESCRIPTION OF THE DRAWINGS

Illustrated in the accompanying drawings are a principal embodiment of the invention and variants of certain details.

FIG. 5 shows a variant of an integral part of the arrangement.

BEST MODE OF CARRYING OUT THE INVENTION

Figure 1:
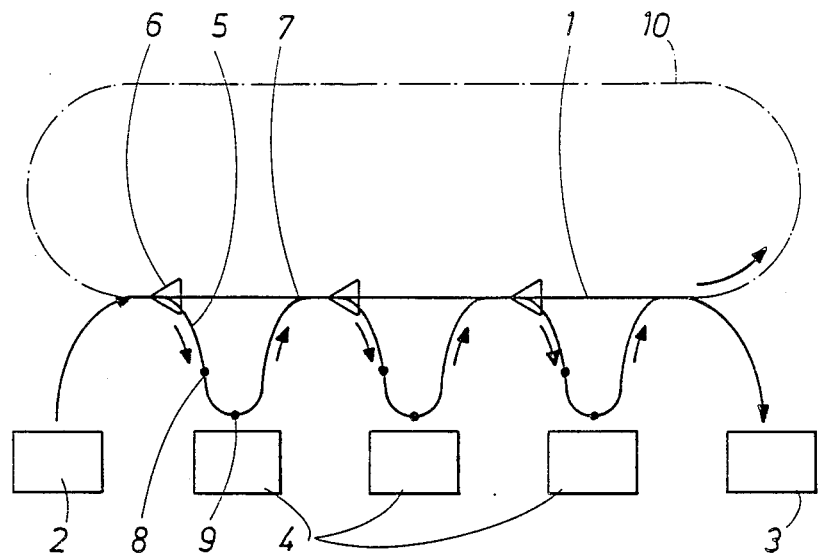
FIG. 1 in this case shows in schematic form a view from above of a typical layout of a system of this kind.

The system illustrated schematically in FIG. 1 consists of a principal conveyor line 1 in which are arranged an input station 2 and an output station 3. Along the line 1 are arranged a number of work stations 4. Between the principal conveyor line 1 and the work stations run side conveyor lines 5. Each of these is connected via a change-over device 6 to the principal conveyor line 1 and runs in a loop as far as each station 4, to be re-connected to the principal conveyor line 1 at a point 7 after the change-over device 6.

After a work piece has been fed onto the principal conveyor line 1 from the input station 2, this work piece can be diverted to the work stations 4 by some type of address equipment which controls the change-over devices 6. On each side conveyor line 5 it is possible for the work pieces to adopt a waiting position 8, which is provided more often than not for collecting work pieces, or, after having been advanced further, a stationary position 9. In the stationary position at each work station 4 it is presumed that processing will take place, whereupon the work piece can be advanced further along the side conveyor line 5 and onto the principal conveyor line for onward transport to other work stations. If, as indicated by a line of dots and dashes 10 in FIG. 1, the conveyor line consists of an endless loop, the work piece can be guided in any desired sequence through the different work stations, irrespective of how these are situated one after the other, by allowing it to cover several circuits of the loop. Once all the operations in the system have been performed, the work piece can be discharged for further transport via the output station 3.

A system of this kind thus belongs to the category of systems of the second type referred to by way of introduction. In the case of the first-mentioned type of system the work stations are situated directly on the principal conveyor line and must lie in the same sequence as the respective operations.

Systems of the kind described and illustrated in FIG. 1 are, as has already been mentioned, often used in the ready-made clothing industry. The following, more detailed description is also based, in those cases in which the type of work piece is shown, on references to the ready-made clothing industry.

Figure 2:
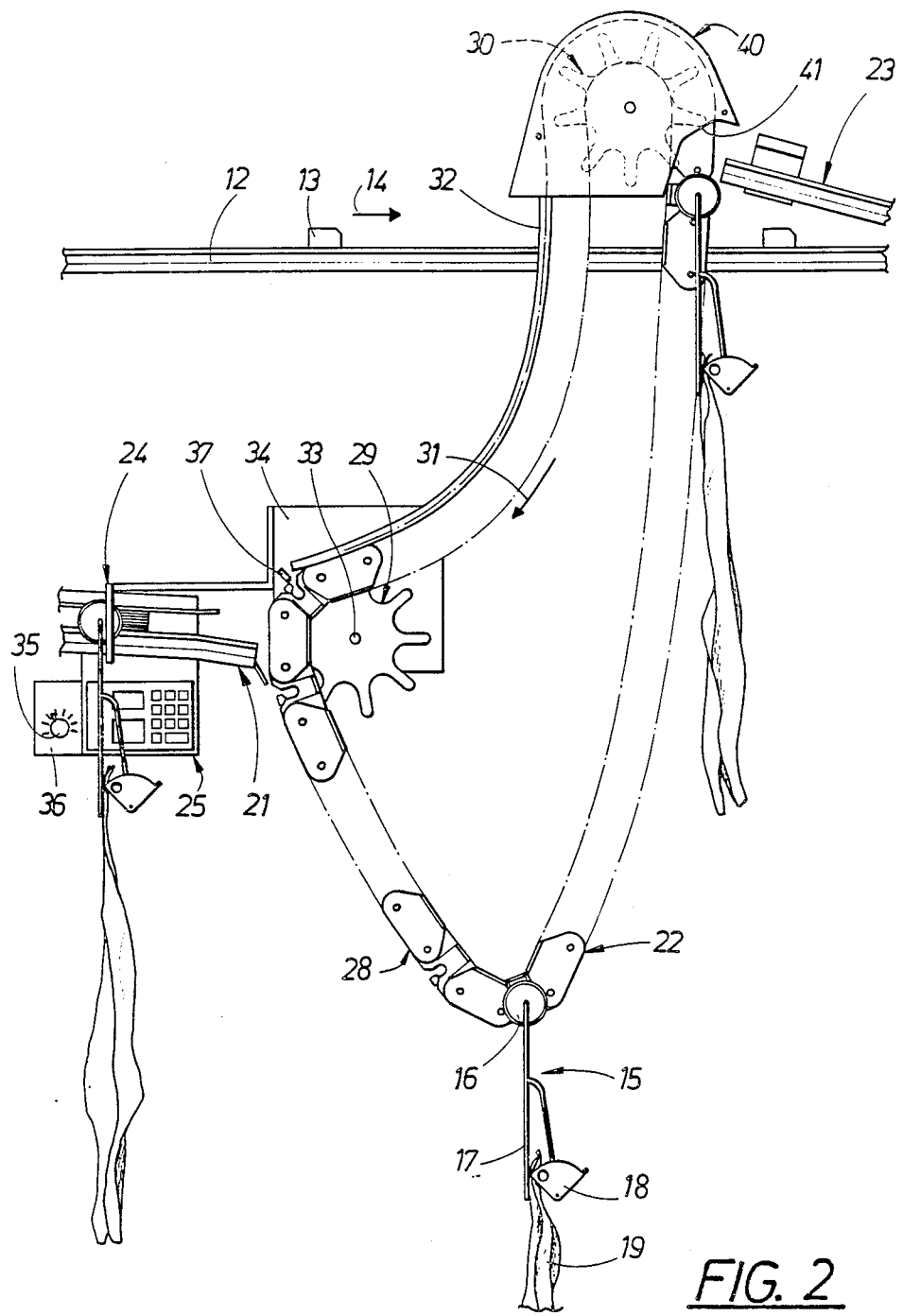
FIG. 2 shows the arrangement in accordance with the invention applied as a part of a side conveyor in the system.

The arrangement in accordance with the invention is shown in a side view in FIG. 2 as constituting a part of a conveyor in a side conveyor line in the form of a line of the kind designated by the reference 5 in FIG. 1. The aforementioned principal conveyor line is represented in this case by a rail 12, which can form an endless loop (cf. FIG. 1). Running along the rail 12 and driven by a belt or a chain are a number of drivers 13 moving in the direction indicated by the arrow 14. Trolleys 15 can move along the rail; see the bottom of FIG. 2. These trolleys exhibit two rollers 16 separated by a waisted part which can run on the rail, and a downward-facing fork 17 in which the work pieces 19 can be suspended by means of a clip 18, with the work pieces in this case being parts of garments which are to be manufactured. As they move, the drivers 13 carry the trolleys 15 along the rail 12.

The side conveyor line 5 indicated in FIG. 1 is shown in FIG. 2 to consist of a first rail section 21, of which only the finishing end is shown in FIG. 2, a chain conveyor 22, which constitutes the actual arrangement in accordance with the invention, and a second rail section 23. The rail section 21 runs in a downward-facing curve from a change-over device which connects its starting end to the rail 12 on the principal conveyor line and leads down to the finishing end shown in FIG. 2 adjacent to an input point for the chain conveyor. The rail section 23 runs from an output point adjacent to the chain conveyor 22 to a switch-over point for the rail 12. The aforementioned change-over point is so adapted as to divert trolleys which are being moved along the rail 12 onto the rail section 21 or past the change-over point for continued transport on the rail 12, depending on the setting of an address arrangement for the distribution of the trolleys 15 in the system. The address arrangement can consist of sensing or indicator devices on the trolleys 15 or can take the form of a central piece of equipment which will switch the change-over points in accordance with an indication of the identity of the trolleys and in accordance with a pre-determined address pattern. Both the change-over points which are suitable for this purpose and the address arrangements have been previously disclosed, for instance in the U.S. patent referred to by way of introduction, and will accordingly not be described in any greater detail here.

It is necessary to know, in order to understand the function of the arrangement described here, that the trolleys 15 can reach the arrangement illustrated in FIG. 2 via the rail section 21. Its finishing end is provided for this purpose with a locking arrangement 24, ahead of which the trolleys 15 can be collected and can then be moved onwards one by one by releasing the lock, thereby providing a kind of buffer arrangement. According to what is illustrated in FIG. 2, the locking arrangement 24 at the same time constitutes a re-addressing arrangement because it is presumed that the trolleys 15 carry in the rollers 16 a mechanical addressing arrangement for controlling the aforementioned change-over point; cf. the aforementioned U.S. patent. This arrangement can only contain a single address, and once it has reached that address, re-addressing to the next station involved must take place. This is done by means of mechanical devices in the locking arrangement 24 after entering the desired new address via a keyboard 25. If a central addressing system or a pre-programmed address pattern are used, then no re-addressing equipment will be required at the station.

The rail section 23 is, as will be appreciated, so arranged as to slope away from the chain conveyor 22, and once they have been transferred to the rail section 23, the trolleys 15 will roll down along same and will be transferred gradually to the rail 12 and will be gripped by one of the drivers 13 for onward transport. It will also be appreciated from the aforementioned U.S. patent how such an arrangement can be executed.

The chain conveyor 22 exhibits a chain 28 which runs over two chain wheels 29 and 30. The direction of driving will be that indicated by the arrow 31. From the chain wheel 30 the chain 28 runs along a slide 32 which imparts a certain tension to the chain. The chain wheel 29 is a driving wheel and is attached to a shaft 33 which protrudes from a driving mechanism in a box 34. The driving mechanism is so arranged as to be capable of driving the chain wheel for a certain number of steps, which number can be set by means of an adjuster knob 35 on a control box 36. The stepping function can take place by means of an adjustable stepping motor of a previously disclosed type or, as assumed here, by means of a motor whose operating periods are controlled by a light sensor 37, which, with the help of a beam of light, senses how many links have travelled past it.

From the chain wheel 29 to the chain wheel 30 the chain 28 extends in a freely suspended curve. The chain wheel 30 is enclosed within a cover 40 open to the bottom, the edge 41 of which, at the point where the chain 28 enters, is executed in the form of a curve running out towards the periphery of the cover, which curve is so arranged as to interact with the roller 16 of the trolley 15.

The chain 28 is now described in more detail with reference to FIGS. 3 and 4. A length of the chain is shown in a partially sectioned view in the two Figures, together with a chain wheel which has been designated 42 and which is of the same kind as the chain wheels 29 and 30 illustrated in FIG. 2. The chain 28 in the embodiment shown consists of two types of links, which are referred to in the following as the supporting links 44 and the intermediate links 45. The links are held together one to the other by the supporting links 44 being provided with two pairs of pins, with each pair consisting of a pin on either side of the link in a coaxial position in relation to one another, and by the intermediate links 45 being provided with corresponding holes 47 in walls with which the intermediate link 45 encloses connecting supporting links. The intermediate links 45 in actual fact exhibits a 'U'-shaped cross-section, at least at the ends of the link and in the vicinity of the holes 47, and in this case exhibit two walls which have the configuration shown in FIG. 3 and also a frame at the inner edge of the link connecting the walls together where the walls bear strip-shaped projections 48. In order to provide the link with increased strength and rigidity the walls can also be joined together at other points, but not where the end parts of the supporting link are to be situated, but on the other hand appropriately in the area between the holes 47. The material in the links is preferably a rigid plastic, and they can in this way easily be connected together by being pushed in between the walls of the link over the relatively short pins 46 on one side part of the supporting link whilst springing out the walls until they snap into the holes 47 around the pins 46. Separation takes place by breaking open the walls so that they can slide out over the pins.

Figure 3:
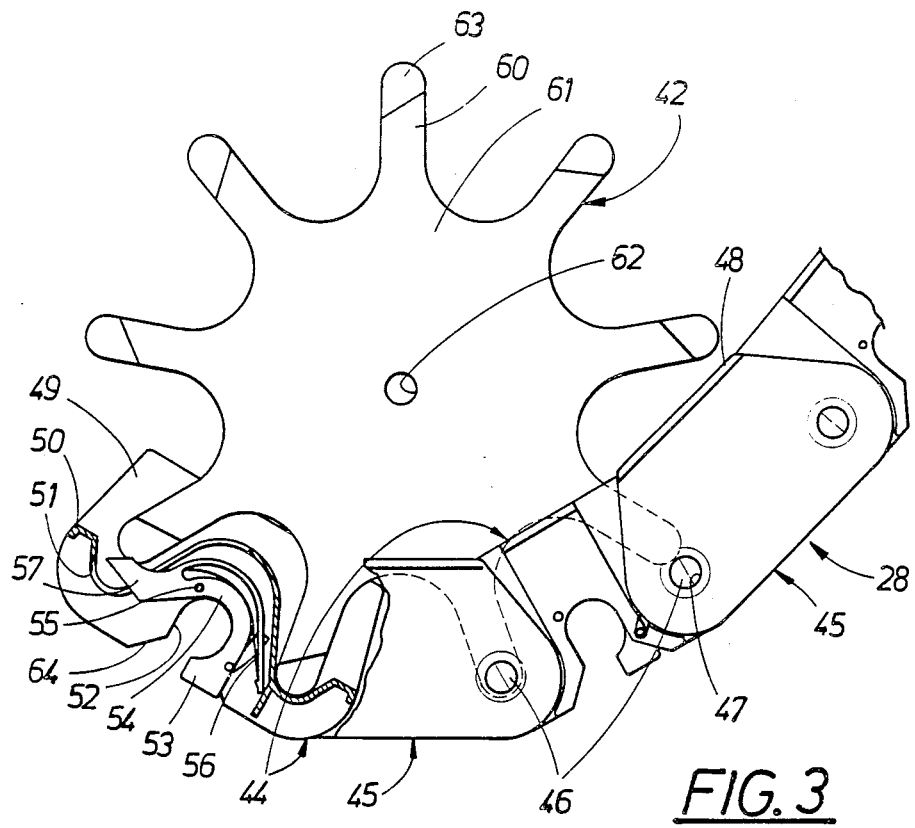
FIG. 3 shows parts of the arrangement in accordance with the invention in a first functional position, partly as a cut-away view and partly in cross-section.

The intermediate link 45 illustrated in FIG. 3 is executed as a single piece. The supporting link 44, on the other hand, consists of a main part formed from two walls 49 of configuration essentially identical with the walls of the intermediate link, but connected along a frame 50 extending in the form of curves at the central part of the link, which frame is provided with an opening 51. A 'U'-shaped recess 52 extends in the walls from the outer edge of the link. There projects into this recess a locking tooth 53 belonging to a locking arm 54, which is pivotally mounted in the walls 49 by means of two pins 55 opposite one another. The locking arm 54 endeavours through the effect of a spring arrangement 56 to adopt a position with the locking tooth 53 projecting into the recess 52. At the opposite end of the locking arm 54 in relation to the locking tooth 53 there is present an actuating tooth 57, which lies alongside the space which is formed between the walls 49, so that it occupies only about one half of the height of that space. The actuating tooth 57 extends out through the opening 51 and into the frame 50.

The curved frame 50 in the supporting link 44 constitutes toothed surfaces for engagement with the chain wheel 42. This is provided with teeth 60 projecting from a hub component 61 with a shaft hole 62. The teeth 60 are reduced in size in the vicinity 63 of the tip, so that the thickness of the tooth is only about one half of that of the wheel of otherwise essentially uniform thickness.

When the chain wheel 42 is turned in the manner illustrated in FIG. 3, the areas 63 can be inserted alongside the actuating tooth 57 on the locking arm 54, and in this way the latter will not be actuated by the engagement of the teeth with the frame 50 of the link, which means that the locking tooth 53 will remain in its locking position illustrated in FIG. 3 through the effect of the spring arrangement 54.

Figure 4:
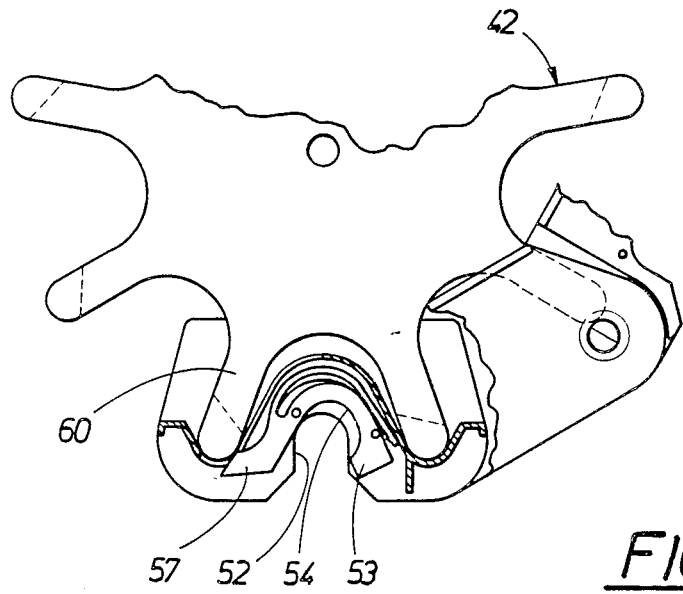
FIG. 4 shows in the same way a second functional position.

If, on the other hand, the wheel is turned in the manner illustrated in FIG. 4, the remaining tip of the tooth 60 will be situated on the same side of the space between the walls 49 as the actuating tooth 57, and the actuating tooth will be forced inwards on engagement of the tooth, so that the entire locking arm 54 pivots and the locking tooth 53 is moved out of the recess 52. By installing the wheel turned so as to face in one direction, it is thus possible to cause the chain to run around the wheel without its locking function being actuated. On the other hand, with the wheel turned to face in the other direction, the locking effect will be over-ridden for each of the links for as long as they remain in full engagement with the chain wheel.

The recesses 52 in the supporting links 44 are so adapted as to enclose the waisted part between the two rollers 16 on the trolley 15 (see FIG. 2). If the waisted part is introduced into the recess and the locking tooth 53 is situated in the locking position shown in FIG. 3, the trolley will be restrained. If, on the other hand, the locking tooth is caused to pivot out of the way, as shown in FIG. 4, the trolley will be released. By providing the recess 52 with sloping edges 64 at its entrance, it is possible for the aforementioned waisted part on the trolley to be fed into the inside of the locking tooth 53 if it is pushed into the opening between the locking tooth and the sloping edge 64. The arrangement thus provides a locking effect such that feeding in can take place for the purpose of restraining the trolley in the supporting link without any other influence apart from pushing the waisted part into the aforementioned opening, whilst release can take place only by positively forcing the locking tooth back against the effect of the spring, such forcing back being achievable with the help of one of the chain wheels if this is installed in a suitable position for that purpose. Irrespective of whether the wheel has been installed in one or other position, it can be secured to the shaft like a driving wheel or can be made to rotate freely like an idler wheel.

A modified embodiment of the intermediate link 45 is shown in FIG. 5. This variant differs from the previously described link only in that the central part between the holes 47 is provided with a hinge 66 which allows the link to be bent along an axis perpendicular to the axis through the holes 47. A chain which contains intermediate links of the variant type illustrated in FIG. 5 can be bent not only in the plane in which the links extend with their side walls by being rotated about the pins 46, but also at right angles to this plane by means of the hinge 66. The ability to bend in the latter sense for a certain distance of the chain depends on how many links with the hinge 66 are inserted along that distance. The greatest flexibility is, of course, achieved if all the intermediate links are provided with hinges, although it is also possible, for example, to provide every other intermediate link with a hinge. It must also be added that the elastic capacity of the material in the links, which are preferably executed in a relatively thin material, as well as a certain amount of free play in the pins 46, permits a certain amount of lateral flexing of the chain even if it is not fitted with any links with the hinge 66.

On the basis of the assumptions indicated above to the effect that the trolleys 15 are provided with addressing arrangements which permit them to be diverted from the rail 12 of the principal line 1 onto one of the side conveyors 5 by the actuation of the change-over device concerned, the situation may arise in which a trolley 15 has arrived at the waiting position in the locking arrangement 24 via the rail section 21. Since it is assumed in the illustrative embodiment that the system in question is adapted for the manufacture of ready-made garments, the trolleys carry, as shown in FIG. 2, parts 19 of garments or finished garments for final processing. When the work piece is to be dealt with, the locking arrangement 24 is released and the trolley travels onwards along the rail section 21 and arrives at the chain 28, on its chain wheel 29, positioned in front of the end of the rail section 21. The command signal which releases the locking arrangement 24 transmits at the same time of slightly beforehand a starting signal to the driving motor for the chain in the box 34 instructing it to advance the chain by the distance set by means of the adjuster knob 35. As soon as the first supporting link 44 with its recess 52 has moved past the end of the rail, the trolley will roll into the recess, whilst the locking tooth 53 is pressed aside so that the trolley is held suspended from the supporting link. Further movement causes the trolley to be moved downwards. In the design in accordance with FIG. 2 it has been assumed that the chain motor is set to move the chain over a distance such that, after the movement phase is complete, the trolley will be situated in the lowest position shown in FIG. 2. This position has been selected to provide the best possible starting position for the processing which is to take place.

Although it is assumed as a general rule that the work piece can continue to be held by the trolley 15 during processing. The freely suspended curved length of chain in actual fact imparts a certain degree of mobility to the trolley in all directions, which mobility can be further increased laterally (perpendicular to the plane of the paper in FIG. 2) by the introduction of the aforementioned hinged intermediate links 45 in accordance with FIG. 5. For this reason a work piece which is hanging correctly can in many cases be introduced into a machine for processing whilst remaining attached to the trolley. Lateral movement can be avoided in certain cases by allowing the work piece to be lowered directly down into a processing position whilst the chain is running essentially vertically downwards towards the chain wheel 29. In other cases the intended operation may be an inspection or the attachment by hand of an object to the work piece. In such cases the work piece can be allowed to hang down and the operation can be performed in that position, perhaps even without the work piece requiring to be touched.

Once the processing of the work piece is complete, a new command signal is given which results in rotation of the chain wheel 29, so that the trolley is moved from its lowest position upwards by the chain as far as the cover 40 and the chain wheel 30. Whilst the chain wheel 29 is turned to the position illustrated in FIG. 3 and, as previously described, restraining of the trolley can take place, the chain wheel 30 has, on the other hand, been turned in the manner illustrated in FIG. 4, and the locking tooth 53 will thus be withdrawn when the link in question enters into engagement with the chain wheel. This results in the trolley rolling out of the recess 52 when it comes directly in line with the section 23. The curve 41 is provided in order to ensure its discharge, which curve, in conjunction with the upward movement of the trolley, will cause the latter to move in the direction of the rail section 23. The chain wheel 30 is moved by that part of the chain which runs from same to the driven chain wheel 29, by that part being obliged at all times to follow a particular curved path by the guidance from the rail 32.

As indicated by way of introduction, a principal object of the invention is to transport work pieces or similar to an operation point in such a way that further movement in conjunction with the operation is avoided to the highest possible degree, and in any case is facilitated. This object is achieved in the case of the invention by means which are easily adjustable to suit different types of transport having regard for the nature of the object being transported and the nature of the operation, the transport distances and other factors. What is achieved additionally by the invention is that the means applied are simple and versatile, so that a limited range of standard equipment can be adapted to suit a number of different cases and factors without having to find any special solutions. The means which permit such an advantageous arrangement are essentially the following:

1. The fact that a chain is used in at least the transport area as far as the operation point means that the track for the transport forwards can be modified in a simple fashion by guiding the chain in different tracks by simple means such as the installation of chain wheels at particular points of deflection and the use of simple rails for forming particular tracks (compare the rail 32 in FIG. 2 and the strips 48 in FIG. 3, which can be used for positive guidance in a 'C'-shaped profile).

2. The fact that the chain can be made freely suspended allows guide arrangements to be omitted for part of the track of the chain.

3. The freely suspended part of the chain provides great flexibility for the object being transported, so that it can be moved to the operation point without having to be removed from the conveyor chain (by making the chain capable of bending in two planes by means of links such as that illustrated in FIG. 5, the flexibility of the chain can be increased further).

4. The fact that the chain can be parted easily permits links to be inserted or removed, thus enabling a freely suspended part to be lengthened or shortened, or modifications to be made to accommodate other changes in the route of the chain.

5. The fact that the chain is able to pick up objects for transport or carriers for same and to deposit them means that the chain can be inserted as a link between other transport means, for example rail transport tracks, and the chain can be used for collecting objects for transport from a buffer store and likewise for depositing objects for transport in a buffer store.

6. The distribution of objects for transport can be controlled simply by the inclusion of a release arrangement for the means of securing the object for transport (in accordance with the embodiment the release arrangement can consist of a chain wheel, cf. FIGS. 3 and 4, which can be used as a driving wheel or an idler wheel and for the aforementioned distribution, depending on the nature of its installation).

7. The chain can be used for both horizontal and vertical transport and can be bent in two planes (if it is fitted with links in accordance with FIG. 5).

8. Vertical transport can be utilized for transporting objects between different floors and also for arranging buffer stores above the operation points, so that the objects are lowered with the help of the chain when they are to be moved to the operation point.

The reported advantages and possibilities can be achieved with the embodiment described and illustrated here. Nevertheless the invention can, as will already have been appreciated to a certain extent above, be given many embodiments within the scope of the following Patent Claims. It can thus be provided with gripping devices for carrying the objects being transported directly, instead of via separate carriers. If carriers are used, these can have a large number of different forms other than the trolley illustrated, which is intended for holding pieces of material for making-up into ready-made garments. Depending on the nature of the carrier arrangement for the object being transported, the arrangement can also be adapted for holding and releasing objects being transported.

I claim:

1. A conveyor including first conveyor means to transport objects, such as carriers for workpieces, along a first transport line in an upper transport level, and a plurality of second conveyor means along said transport line to transport objects between said upper level and a lower level in which object receiving stations, such as work stations, are located, said second conveyor means operating independently of said first conveyor means, selectively actuable first transfer means situated at first connection points between said first and second conveyor means to transfer the objects from the first conveyor means to the second conveyor means, and second transfer means at second connection points between said first and second conveyor means to selectively transfer objects from said second conveyor means to said first conveyor means, and wherein each of said second conveyor means comprises a chain conveyor positioned along the transport line of said first conveyor means, said chain conveyor comprising an endless chain, driving means for moving said chain in an endless loop in a transport line having a transport direction from one of said first connection points to one of said second connection points, and in an idle line from said one second connection point to said one first connection point, and there is provided supporting means at the upper end of said loop for carrying said chain with the lower end of the loop hanging free from the supporting means, said chain having a plurality of object carrying links, said links having releasable holding means for receiving an object at a receiving outer end thereof and for holding it at an inner portion thereof, and locking means at the receiving end which, in a first position thereof, permits said end to be free for introduction of the object into said inner portion and which, in a second position thereof, locks the object so that it is arrested at said inner portion, said supporting and driving means including actuation means for holding said locking means in its first position at the second connection point and allowing it to be in its second position during passage of the free hanging loop.

2. A conveyor according to claim 1, wherein each of said object carrying links have a body, and pivoting means at each end of the body for connecting the link with adjacent links of the chain, said holding means being in the form of a recess in an intermediate portion of the link with said receiving outer end being an inlet opening of the recess and said inner portion being an inner, closed end of the recess, and wherein said locking means comprises a pivotable arm having a first end which, in said first position of said locking means, is withdrawn from said inlet opening of the recess and which, in said second position of said locking means, is pivoted to close said inlet opening of said recess so that an object is arrested.

3. A conveyor according to claim 2, wherein there is provided spring means biased for urging said arm to its second position, said arm being moved to its first position by either the pressure of an object when introducing the same from the outside into said inlet opening of said recess, or by being pivoted by force from the supporting and driving means during passage of its associated link allowing the object in the recess to be moved out thereof.

4. A conveyor according to claim 2, wherein pivoting means of the chain includes said pivoting means for pivoting the links of the chain relative to each other in a longitudinal plane of the chain, and further pivoting means for pivoting the chain in a plane perpendicular to said longitudinal plane, so that the chain can be bent in said loop and in a sidewise direction transverse thereto.

5. A conveyor including first conveyor means comprising a substantially horizontal rail in an upper transport level for supporting carriers for objects such as work pieces, driving means for moving the carriers along the rail, a plurality of second conveyor means along the rail to transport carriers between said upper level and a lower level and connecting to the rail by means of first selectively actuable transfer means in the form of rails having a first end connectable to said rail for transferring carriers which are moved along said rail and another end adjacent to said second conveyor means, and second transfer means each in the form of a rail extending from one of said second conveyor means to said first conveyor means, and said second conveyor means each being in the form of a chain in an endless loop extending with a transport portion from said first transfer means to said second transfer means an an idle loop from said second transfer means to said first transfer means, said chain including links each having a body, pivoting means for pivotable connections to adjacent links at each end of said body, a recess having an inlet opening in an intermediate portion of said body for receiving one of the carriers transferred from said first conveyor means via the rail included in said first transfer means, and locking means in said inlet opening for arresting the carrier introduced into the recess, and there is driving and supporting means for driving and carrying the chain loop comprising a cog wheel at the second transfer means for cooperating with said locking means to free the carrier arrested in the recess, so that the carrier can be moved from the chain to the second transfer means for returning it to the first conveyor means.

* * * * *